(12) United States Patent
Rupp

(10) Patent No.: US 11,193,880 B2
(45) Date of Patent: Dec. 7, 2021

(54) GAS ANALYZER AND GAS ANALYSIS METHOD

(71) Applicant: Siemens Aktiengesellschaft, Munich (DE)

(72) Inventor: Simone Isabel Rupp, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 290 days.

(21) Appl. No.: 16/516,434

(22) Filed: Jul. 19, 2019

(65) Prior Publication Data

US 2020/0025673 A1 Jan. 23, 2020

(30) Foreign Application Priority Data

Jul. 20, 2018 (EP) .................................... 18184805

(51) Int. Cl.
*G01N 21/03* (2006.01)
*G01N 21/3504* (2014.01)
(Continued)

(52) U.S. Cl.
CPC .......... *G01N 21/0303* (2013.01); *G01J 3/021* (2013.01); *G01N 21/3504* (2013.01); *H01S 3/10* (2013.01)

(58) Field of Classification Search
CPC ........ G01J 3/021; H01S 3/10; G01N 21/0303; G01N 21/3504; G01N 30/74; G01N 21/031
See application file for complete search history.

(56) References Cited

U.S. PATENT DOCUMENTS 9,250,175 B1 * 2/2016 McManus ............ G01N 21/031
10,365,204 B2 * 7/2019 Rubin .................... G02B 7/182
(Continued)

FOREIGN PATENT DOCUMENTS

CN 102879898 1/2013
CN 104155241 11/2014
(Continued)

OTHER PUBLICATIONS

Gurlit-W—Lightweight diode laser spectrometer CHILD for balloonborne measurements of water vapor and methan Gurlit, Zimmermann et al; 2005.
(Continued)

*Primary Examiner* — Rebecca C Bryant
(74) *Attorney, Agent, or Firm* — Cozen O'Connor

(57) ABSTRACT

Gas analyzer or gas analysis method, in which beams of at least two different radiation sources are coupled into a Herriott cell containing a measurement gas and, after being reflected multiple times, are coupled out therefrom and detected, wherein the beams are aligned such that they strike mirrors in point patterns which extend along ellipses, where the different ellipses lie inside one another and have two shared vertices (co-vertices) on a shared axis of symmetry, whereas the other co-vertices (or vertices) do not coincide, the beams of at least two of the different radiation sources are coupled into the Herriott cell at differing points of the associated point pattern and/or are coupled into the Herriott cell such that they pass through the associated point patterns along the ellipses in opposite directions, and where all beams are coupled out at the point of one of the shared vertices.

10 Claims, 5 Drawing Sheets

(51) Int. Cl.
  *G01J 3/02* (2006.01)
  *H01S 3/10* (2006.01)

(56) References Cited

U.S. PATENT DOCUMENTS

| | | |
|---|---|---|
| 2010/0140478 A1 | 6/2010 | Wilson et al. |
| 2012/0242989 A1 | 9/2012 | So et al. |
| 2016/0069797 A1 | 3/2016 | Chanda et al. |
| 2016/0274024 A1 | 9/2016 | Han |
| 2017/0139191 A1 | 5/2017 | Paul |
| 2017/0299503 A1 | 10/2017 | Black et al. |
| 2017/0307519 A1 | 10/2017 | Black et al. |

FOREIGN PATENT DOCUMENTS

| | | |
|---|---|---|
| CN | 105548048 | 5/2016 |
| CN | 106483071 | 3/2017 |
| DE | 4331847 | 4/1994 |
| EP | 1972922 | 9/2008 |
| EP | 2375237 | 10/2011 |
| WO | WO2017/182787 | 10/2017 |

OTHER PUBLICATIONS

Moreau G et al: "SPIRALE: A Multispecies in Situ Balloonborne Instrument With Six Tunable Diode Laser Spectrometers", Applied Optics, Optical Society of America, Washington, DC; US, vol. 44, No. 28, pp. 5972-5989, XP001235519, ISSN: 0003-6935, DOI: 10.1364/AO.44.005972; 2005; Abstract; p. 5979, right column—p. 5980, left column; Figures 6,7.

Ming Dong et al: "Double-range near-infrared acetylene detection using a dual spot-ring Herriott cell (DSR-HC)", Optics Express, vol. 26, No. 9, p. 12081, XP55524490, DOI: 10.1364/OE.26.012081; 2018; Abstract: p. 12083, paragraph 2, p. 12085.

Tarsitano C G et al: "Multilaser Herriott GELL for Planetary Tunable Laser Spectrometers", Applied Optics, Optical Society of America, Washington, DC; US, Bd. 46, Nr. 28, pp. 6923-6935, XP001508502, ISSN: 0003-6935, DOI: 10.1364/AO.46.006923; 2007; Abstract; p. 6927, left column; p. 6930, richt column—p. 6931, left column; p. 6932; Figures 1,9; p. 6934, left column, paragraph 1; p. 6933, right column.

Webster-CR—Aircraft (ER-2) laser infrared absorption spectrometer (ALIAS) for in-situ stratospheric measurements of HCl N2O CH4 NO2 and HNO3 C. R. Webster, R. D. May, C. A. Trimble, R. G. Chave, and J. Kendall; 1994.

Office Action dated Sep. 29, 2021 issued in Chinese Patent Application No. 201910657408.9.

Wang "Research and Design of Absorption Cell of High-Precision Infrared Multi-Gas Sensor", China Master's Theses Full-Text Database Engineering Science and Technology I, No. 10, Chapter 3, Section: 3.3, pp. 30-33, Oct. 15, 2014.

\* cited by examiner

GAS ANALYZER AND GAS ANALYSIS METHOD

BACKGROUND OF THE INVENTION

1. Field of the Invention

The invention relates to a gas analyzer and to a gas analysis method.

2. Description of the Related Art

Absorption spectroscopy is a widely used technique for determining gas concentrations. In this technique, lower gas concentrations can be detected if the absorption of light in the gas to be measured is greater. According to the Beer-Lambert law, absorption increases as the light path through the medium to be measured increases. In order to enable long light paths with simultaneously limited available space and/or with low gas volumes (e.g., necessary for a rapid gas exchange), what are known as multi-pass cells are often used, in which a laser beam is folded optically and thus is guided through the same gas volume multiple times. Frequently used examples of such multi-pass cells are what are known as White cells and Herriott cells, in which a laser beam is reflected back and forth multiple times between mirror surfaces, before it is detected.

The cell of the (non-astigmatic) Herriott type is particularly suitable for use in an industrial setting due to its optomechanical robustness. The Herriott cell consists of two spherical mirrors, which are situated with a certain spacing apart from one another with mirror faces facing one another. A light beam (as a rule a laser beam) can be coupled into the cell through an entry window, in the simplest case a hole, in one of the mirrors. The beam is then reflected back and forth between the two mirrors where, depending on the arrangement of the window and coupling-in angle of the laser beam, differing elliptical patterns of reflection points (spot patterns) emerge on the mirror surfaces. In a special case, the ellipse transitions into a circle. The circular spot pattern is used in Herriott cells particularly often, because it offers the best compromise between spot spacing and making efficient use of the mirror face. The elliptical or circular spot pattern emerges if the laser beam is coupled into the Herriott cell at a point outside the optical axis shared by the two mirrors and obliquely thereto. The laser beam either exits the cell from the same window or from another window on the same mirror. The path length of the laser beam in the cell is unambiguously defined by the arrangement of the windows and by the focal distance and the spacing of the mirrors. For this reason, another coupling-in angle and thus another choice of the reflection pattern also does not change the path length.

In many cases, it is necessary to measure multiple gas components in a gas mixture to be measured (measurement gas) simultaneously, where the concentrations of the gas components possibly differ from one another by multiple orders of magnitude. In the simplest case, to this end the beams of multiple lasers may be coupled into their own measuring cells in each case, although this is associated with a large space requirement and high costs.

It is therefore desirable to be able to use only a single multipass cell and a single detector to measure all the gas components of interest. To this end, however, it would be necessary to successfully couple the beams of multiple lasers into the cell, such that they each cover a defined path of a certain length, without being disturbed by the coupling-in/coupling-out apparatuses of the other lasers, and finally to direct the different laser beams toward the detector with its limited detector surface (typically in the $mm^2$ range).

In order to couple multiple laser beams into one and the same cell, it is known to overlay the individual laser beams prior to their entry into the cell, such that they substantially cover the same optical path. This may occur, for instance, with the aid of semitransparent/dichroic mirrors (WO 2017/182787 A1), what are known as spectral beam combiners or a fiber-optic combination. The advantage of such methods lies in a single detector being sufficient for measuring the signals of all laser beams once they have passed through the absorption path, because all laser beams are coupled out with the same geometry. In this manner, however, it is not possible to realize differing path lengths for the different laser beams. In addition, these methods generally require expensive optical components, are in part can only be used for a greatly restricted wavelength range and/or are associated with a great reduction in optical power.

One alternative is represented by the simultaneous coupling-in of multiple laser beams at different points of the cell. Although this enables the implementation of different path lengths, in the previously known solutions it is associated with differing coupling-out points of the different laser beams, meaning that a single detector is required for each laser beam.

Thus, W. Gurlit et al.: "Lightweight diode laser spectrometer CHILD (Compact High-altitude In-situ Laser Diode) for balloonborne measurements of water vapor and methane", January 2005, Applied Optics, Vol. 44, No. 1, p. 91-102 describes a Herriott cell for two lasers with differing path lengths. Each laser beam circulates within the cell on its own orbit at reflection points and subsequently exits again through its respective entry window, wherein use is made of the spherical aberrations of the mirrors in order to achieve differing path lengths with the two circles.

Other versions of a Herriott cell for multiple lasers are described in C. G. Tarsitano et al.: "Multilaser Herriott cell for planetary tunable laser spectrometers", October 2007, Applied Optics, Vol. 46, No. 28, p. 6923-6935, G. Moreau et al.: "SPIRALE: a multispecies in situ balloonborne instrument with six tunable diode laser spectrometers", October 2005, Vol. 44, No. 28, p. 5972-5989, and C. R. Webster et al.: "Aircraft (ER-2) laser infrared absorption spectrometer (ALIAS) for in-situ stratospheric measurements of HCl, N2O, CH4, NO2, and HNO3", January 1994, Vol. 33, No. 3, p. 454-472.

While the arrangements of the windows in the above-cited publications differ, they all share the fact that the reflection points of the different laser beams each lie on their own ellipses, these all resulting in the same path length, however. Here, too, each laser beam is detected by a separate detector.

The necessity of using multiple detectors represents a cost factor that should not be underestimated, particularly with measurements in the middle and far infrared range (MIR and FIR), which have increasingly grown in relevance in recent years since the development and improvement of quantum cascade lasers.

DE 43 31 847 A1 discloses a gas analyzer, in which laser beams are coupled into a cylindrical Herriott cell through a radial entry gap or alternatively through individual entry openings with the aid of radially adjacent entry light waveguides, so that the beams strike the mirrors in point patterns which run along concentric circles. The beams are coupled out of the Herriott cell, through an exit gap with a downstream lens and light waveguide, onto a shared detector.

In order to achieve differing path lengths within one and the same Herriott cell, it is known to achieve a change in the spot pattern and the path length by displacing the mirrors relative to one another (EP 2 375 237 A1 or EP 1 972 922 A1), to couple out the laser beam at differing points by rotating the mirror with the exit window, so that the effective passed-through light path differs depending on the window position (CN 104155241 A), or to combine both measures (US 2017/0307519 A1). In principle, there could be additional provision for a simultaneous coupling-in of the beams of multiple lasers, yet an optical design with moving parts has various disadvantages compared with a static design, e.g., higher complexity of the design and higher costs associated therewith, risk of wear, and/or risk of malfunctions, particularly in an industrial setting (e.g. due to the influence of vibrations).

SUMMARY OF THE INVENTION

In view of the foregoing, it is therefore an object of the invention to enable differing path lengths for the beams of different light sources in a single static multi-pass cell and the detection of the beams with only a single detector.

This and other objects and advantages are achieved in accordance with the invention by a gas analysis method and a gas analyzer with at least two different light sources, a detector and a Herriott cell containing a measurement gas with two mirrors, where the radiation sources are arranged and aligned in relation to the Herriott cell such that beams coupled by them into the Herriott cell and reflected between the mirrors strike the mirrors in point patterns which run along ellipses, where the different ellipses lie inside one another and have two shared vertices (co-vertices) on a shared axis of symmetry, whereas the other co-vertices (or vertices) do not coincide, the beams of at least two of the different radiation sources enter the Herriott cell at differing points of the associated point pattern and/or enter the Herriott cell such that they pass through the associated point patterns along the ellipses in opposite directions, all beams exit the Herriott cell at the point of one of the shared vertices (or co-vertices) and strike the detector, and where the beams of the at least two of the different radiation sources pass through differing path lengths in the Herriott cell.

It is also an object of the invention to provide a gas analysis method, in which beams of at least two different radiation sources are coupled into a Herriott cell containing a measurement gas and, after being reflected multiple times, are coupled out therefrom and detected, where the beams are aligned such that they strike the mirrors in point patterns which run along ellipses, where the different ellipses lie inside one another and have two shared vertices (or co-vertices) on a shared axis of symmetry, whereas the other co-vertices (or vertices) do not coincide, the beams of at least two of the different radiation sources are coupled into the Herriott cell at differing points of the associated point pattern and/or are coupled into the Herriott cell such that they pass through the associated point patterns along the ellipses in opposite directions, all beams are coupled out at the point of one of the shared vertices (or co-vertices), and where the beams of the at least two of the different radiation sources pass through differing path lengths in the Herriott cell.

The beams of at least two different light sources, in particular lasers, are thus coupled into the Herriott cell via entry windows in one or both of the mirrors, such that all the beams reflected in the cell circulate on the ellipses which are nested in one another. The exit window lies in a vertex (or co-vertex) shared by all elliptical point patterns. As a result, all beams can leave the cell through this one exit window and, for instance, be bundled at one and the same detector with the aid of an optical unit, e.g., an aspherical lens, placed behind the exit window.

In order to make optimal use of the mirror face, the exit window preferably lies at the point of a shared primary vertex of the ellipses or point pattern, where the outer ellipse is in turn preferably circular.

For each beam, the position of the entry window along the ellipses can be chosen such that the remaining path of the beam in the cell up to the exit window corresponds to the desired path length in each case. The beam, or individual beams, thus does/do not pass through the complete ellipse, but rather only a part thereof.

If the entry and exit windows are situated in the same mirror, then the path length l may be chosen as $l \approx 2 \cdot n \cdot d$, where d refers to the mirror spacing and $n = 1, 2, 3, \ldots$. If the entry and exit windows are situated on differing mirrors, then the path length l may be chosen as $l \approx (2n+1) \cdot d$.

In addition or as an alternative to the arrangement of entry windows at differing points of the associated point pattern, differing beams can be coupled into the Herriott cell such that they pass through the associated point patterns along the associated ellipses in opposing directions. If a beam coupled into the Herriott cell at a certain point of the associated point pattern circulates with the path length $l_1$, then the path length $l_2$ of another beam coupled in at the same point of its point pattern with the reverse direction of travel amounts to $l_2 = l_{tot} - l_1$, where $l_{tot}$ would be the path length with a complete circulation along the ellipse.

It is additionally possible to couple in a further beam through individual entry windows or through each of the entry windows in addition to the one beam, which further beam passes through the ellipse in the reverse direction, so that with N entry windows in one of the mirrors, 2N different wavelengths are able to be realized in the cell.

The differing semi-axes of the different ellipses and the position of the entry windows are preferably chosen such that the spacing thereof is sufficiently great and the different circulating laser beams or parts thereof do not already exit again through the entry window for the other beams.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in more detail in the following by way of example on the basis of the drawings, in which.

DETAILED DESCRIPTION OF THE EXEMPLARY EMBODIMENTS

Figure 1:
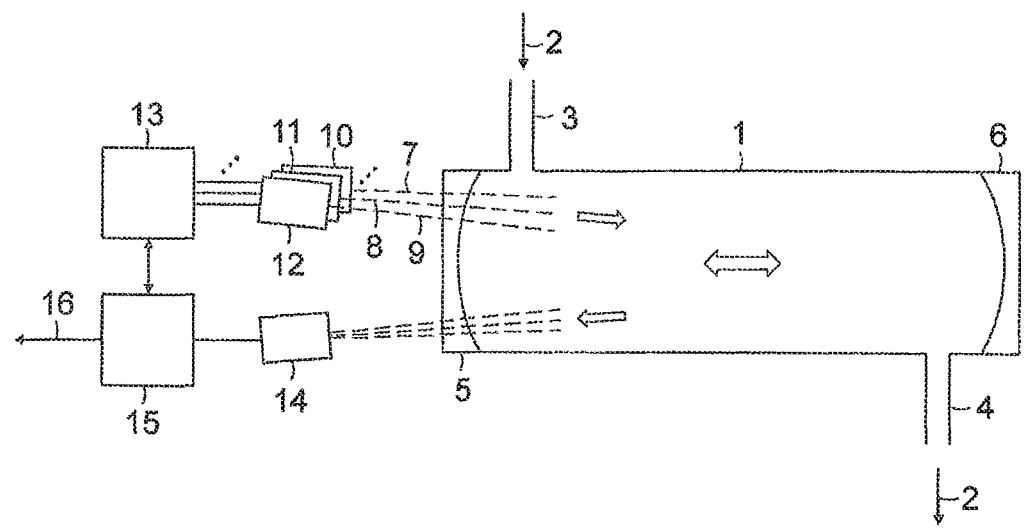
FIG. 1 shows a gas analyzer with a Herriott cell in accordance with the invention.

FIG. 1 shows in a highly simplified schematic representation a gas analyzer with a multi-pass measuring cell in the form of a Herriott cell 1 for accommodating a measurement gas 2 to be analyzed, which is introduced into the Herriott cell 1 via a first gas line 3 and guided out of the cell 1 via a second gas line 4. The measurement gas 2 may, for example, be continuously gathered from an industrial process in the form of a gas sample. The Herriott cell 1 has two spherical mirrors 5, 6 that are opposite one another, between which light introduced into the cell 1 is reflected back and forth. One of the two mirrors, here the mirror 5, for instance, has windows (not shown here) for the coupling-in of light beams 7, 8, 9 that are generated by differing light sources 10, 11, 12. The light sources 10, 11, 12 preferably involve lasers, which emit light in differing infrared wavelength ranges. The light sources 10, 11, 12 may be actuated simultaneously or periodically and successively in a multiplexed manner, e.g., with a ramp-shaped or triangular current, in order to tune the light generated by the light sources 10, 11, 12 in each case over predefined wavelength ranges, in which selected absorption lines of gas components to be determined (target gases) of the measurement gas 2 lie. For the purpose of measurement according to the principle of wavelength modulation spectroscopy (WMS), the ramp-shaped or triangular current can be modulated simultaneously by means of a predefined frequency f.

The light 7, 8, 9 of the light sources 10, 11, 12 absorbed by the gas components of the measurement gas 2 in a wavelength-specific manner, after multiple reflection in the Herriott cell 1, is coupled out of the cell 1 and onto a detector 14 via a window (not shown here) in one of the two mirrors, here e.g., the mirror 5 again. An evaluation facility 15 downstream of the detector 14 evaluates the intensity of the light 7, 8, 9 at the points of the selected absorption lines of the target gases, e.g., in a phase-sensitive manner at one or more higher harmonics of the aforementioned modulation frequency f, and ascertains the concentrations of the target gases therefrom as the analysis result 16.

The radiation sources 10, 11, 12 are each arranged such that they are spaced apart from the optical axis shared by the two mirrors 5, 6 and are aligned at differing angles obliquely thereto, so that the beams 7, 8, 9 coupled into the Herriott cell 1 and reflected between the mirrors 5, 6 circulate on ellipses that are nested in one another. As a function of the respective coupling-in angle, it is possible to implement two differing circulation directions.

Figure 2:
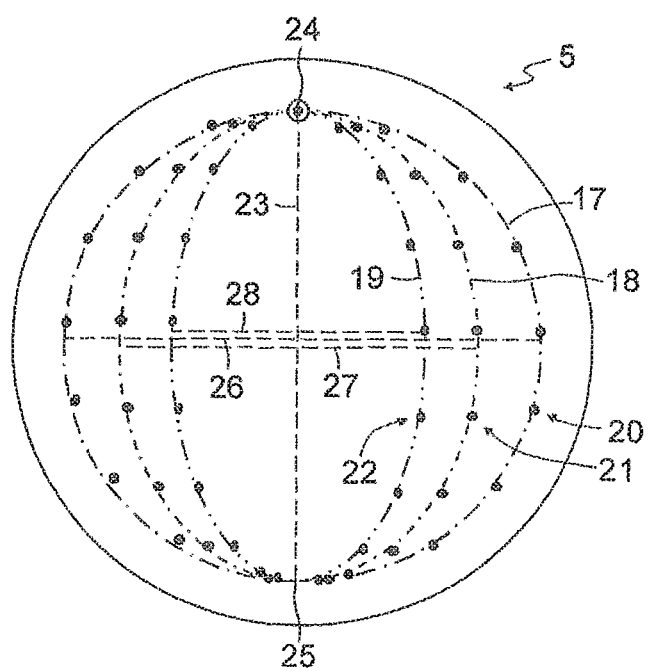
FIGS. 2 to 7 show examples for the point pattern of the beams striking the mirrors of the Herriott cell in accordance with the invention.

As shown by FIG. 2 in the example of the mirror 5, the beams 7, 8, 9 that have been reflected multiple times in the Herriott cell 1 strike the mirrors in point patterns 20, 21, 22 running along ellipses 17, 18, 19. In this context, for instance, the point pattern 20 is generated along the ellipse 17 by the beam 7, the point pattern 21 is generated along the ellipse 18 by the beam 8 and the point pattern 22 is generated along the ellipse 19 by the beam 9. The differing ellipses 19, 20, 21, in the example shown, have a shared primary axis 23 with coinciding primary vertices 24, 25 and differing long secondary axes 26, 27, 28. Furthermore, in the example shown, the largest ellipse 17 forms a circle, so that optimal use is made of the mirror face.

If all beams 7, 8, 9 are now coupled into the Herriott cell 1 through a window provided in the mirror 5 at the point of the primary vertex 24, then they may be coupled out again through the same window, in each case after a complete circulation in the cell 1 along the associated ellipse which depends upon the respective coupling-in angle.

Figure 3:
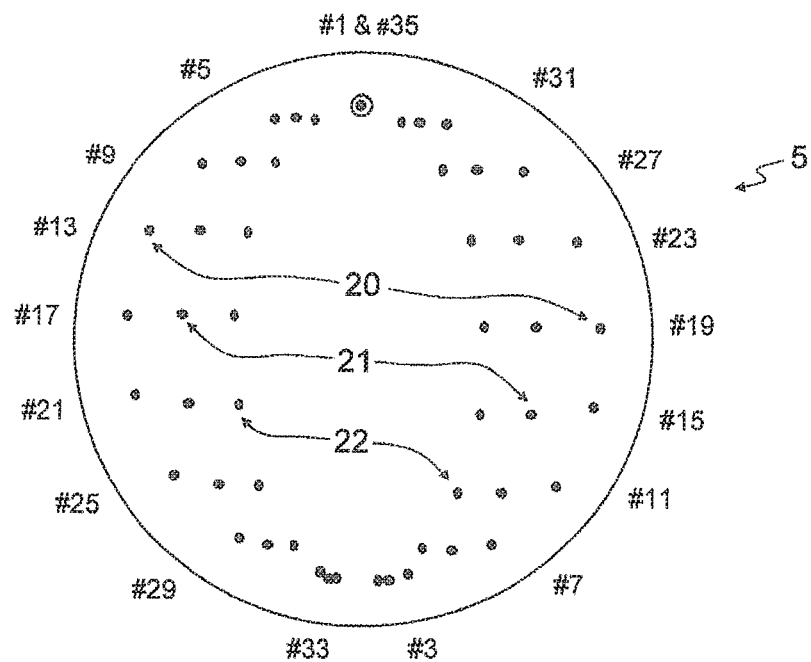
Figure 4:
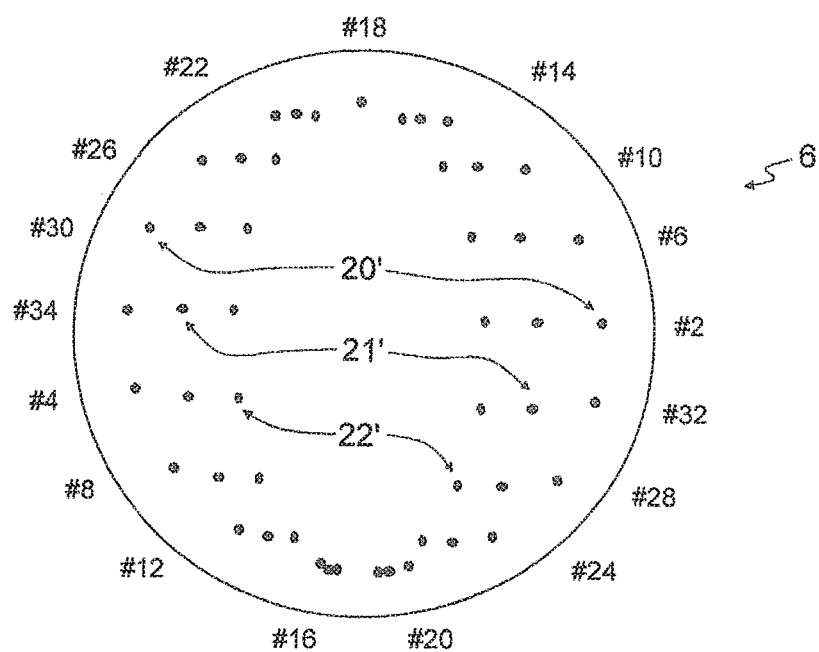

FIG. 3 shows, for this case, the point patterns 20, 21, 22 on the mirror 5 and FIG. 4 shows the corresponding point patterns 20', 21', 22' on the opposite mirror 6, where the numbers along the mirror circumference designate the sequence of the reflections between the entry #1 into the cell 1 and the exit #35 (coincides with #1) out of the cell 1, when the beams circulate in the Herriott cell 1 in the one of two directions. In the case of the opposite circulation direction, the reflections occur in the sequence from #35 to #1. The respective path lengths l of the beams 7, 8, 9 in the cell amount to approximately 34 times the spacing between the two mirrors 5, 6 in the example shown, here.

If one or another of the beams 7, 8, 9 is coupled into the Herriott cell 1 at one of the points, e.g., #13, of the associated point pattern that is different from the primary vertex 24, then the beam in question passes through only part of the ellipse or of the point pattern (#13 to #35) until it is coupled out at the point of the primary vertex 24, and the path length is reduced accordingly, in the described example reduced to 22 times the mirror spacing.

Figure 5:
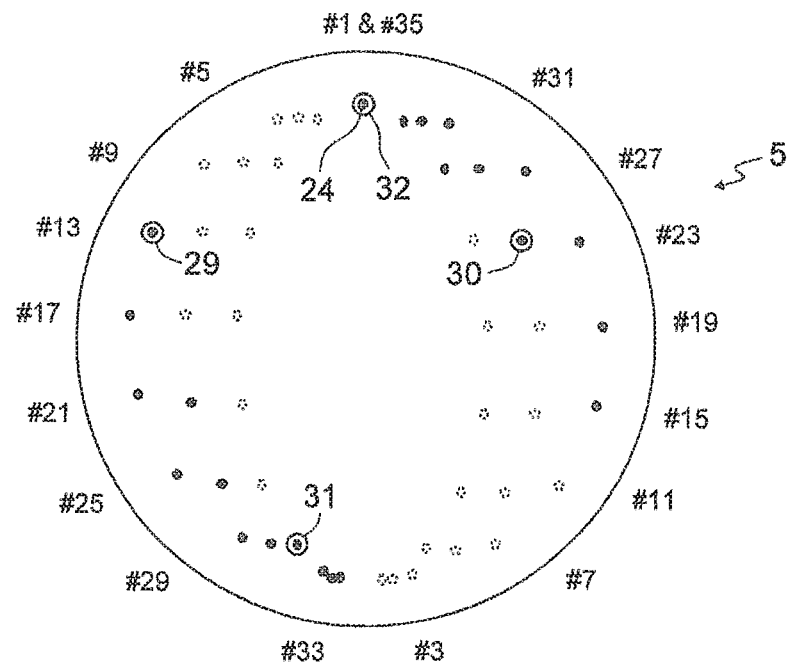

FIG. 5 shows an example, in which the beams 7, 8, 9 enter the Herriott cell 1 through respectively differing entry windows 29, 30, 31 in the mirror 5, here e.g. at the points #13, #23 #29 of the point patterns 20, 21, 22, and circulate on the partial ellipses that are nested in one another until they leave the cell 1 through the shared exit window 32 in the primary vertex 24 (#35). The beams 7, 8, 9 therefore pass through differing lengths of partial paths of the overall path, e.g., the beam 7 along the outer ellipse from #13 to #35 (from #13 to #1 in the reverse circulation direction), the beam 8 along the middle ellipse from #23 to #35 (from #23 to #1 in the reverse circulation direction) and the beam 9 along the inner ellipse from #29 to #35 (from #29 to #1 in the reverse circulation direction). The missing reflection points are shown as dots.

Figure 6:
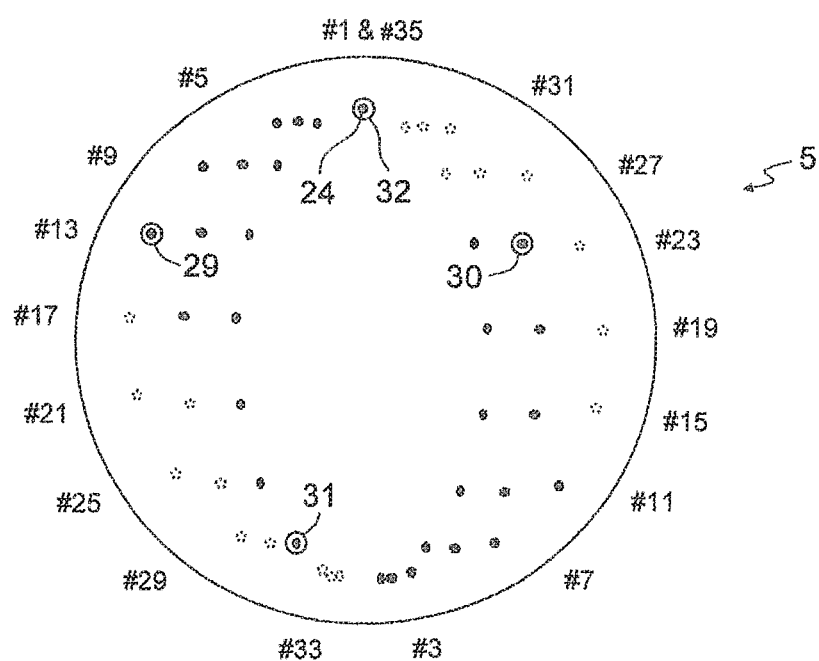

As clarified based on FIG. 6, in addition to the beams 7, 8, 9, three further beams may be coupled in through the same entry windows 29, 30, 31 from further light sources (not shown here), the entry angles thereof being chosen in each case such that they pass through point patterns 20, 21, 22 or the associated ellipses in the reverse direction and therefore with different wavelengths in turn. If the one beam circulates with a path length $l_1$, then the path length $l_2$ of the further beam extending in the reverse direction amounts to $l_2=l_{tot}-l_1$, where $l_{tot}$ is the path length of a complete circulation. The second beam that is coupled in together with the (first) beam 7 through the window 29 thus extends backwards along the outer ellipse from #13 to #1 (corresponds with #35). The second beam that is coupled in together with the (first) beam 8 through the window 30 extends backwards along the middle ellipse from #23 to #1, and the second beam that is coupled in together with the (first) beam 9 through the window 31 extends backwards along the inner ellipse from #29 to #1. Once again, the missing reflection points are shown as dots.

In this manner, with N entry windows in one of the mirrors, 2N different path lengths are able to be implemented in the cell 1.

Figure 7:
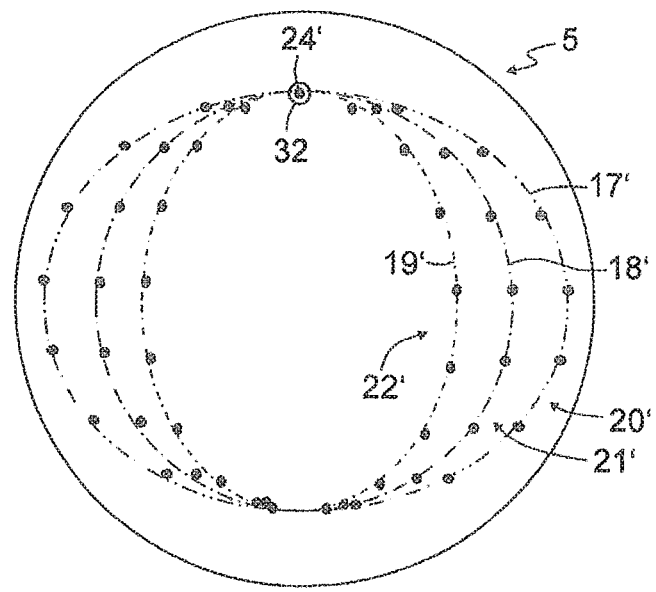

FIG. 7 shows an example of elliptical point patterns 20', 21', 22' on the mirror 5, where the inner ellipse 18' forms a circle, so that the shared vertex (co-vertex) 24 involves a primary vertex of the inner ellipse 19' and a secondary vertex of the outer ellipse 17'.

The invention makes it possible for the first time to simultaneously use multiple light sources with differing path lengths in a single, static multipass cell with a single detector. The combination of all these features is particularly suitable for precise laser-spectroscopic measurements of multiple gas components in an industrial setting while taking into consideration the manufacturing costs. According to the prior art, it was previously only ever possible to achieve partial aspects of this aim, but not the combination of them all, meaning that it was necessary to make concessions either in the measurement (accuracy, number of components) or in the costs. This is described in greater detail below.

On the basis of the invention, it is possible to manufacture a spectroscopic multi-component measurement system in a more cost-effective manner compared with the conventional solutions, because (i) no expensive optical components are used for overlaying the different beams, since each beam circulates on a different path, (ii) a single multipass cell can be used to measure multiple components, so that the costs for mirrors, cell bodies, tubing, if necessary heating etc. are only incurred once, and/or (iii) only a single detector is required for detecting all the beams.

As the invention enables differing path lengths for differing lasers, it is additionally possible to measure gas components with highly varying concentrations and/or absorption characteristics simultaneously. For components that are present in low concentrations or which interact very weakly, the path length can thus be chosen to be sufficiently large, in order to maintain an adequate signal, while in the case of components with a higher concentration or components which interact strongly, saturation of the measurement signal and a falsification of the measurement as a result is avoided by choosing a smaller path length. In the case of a single, fixed path length, by contrast, it would not be possible to measure the two at the same time in a sufficiently precise manner.

Further advantages of the invention compared with the prior art: Unlike the aforementioned prior art solutions, the invention manages to achieve variable path lengths, without moving parts that would give rise to the risk of wear and malfunctions, particularly in an industrial setting (e.g., due to the influence of vibrations). The invention thus enables the construction of reliable and low-maintenance gas analyzers. Compared with solutions that use multiple cells to measure multiple gas components, the size of the measurement device can be reduced by using only one multipass cell. Unlike solutions with beam combination via a spectral beam combiner, different laser wavelengths are possible in a wide range of wavelengths. Unlike solutions with beam combination via semitransparent mirrors, no significant portion of the radiation power is lost before the cell, whereby an improved measurement performance is achieved.

The invention makes it possible to manufacture compact, high-performance and in particular comparatively cost-effective measurement systems for the absorption spectroscopic analysis of gases consisting of multiple components.

Figure 8:
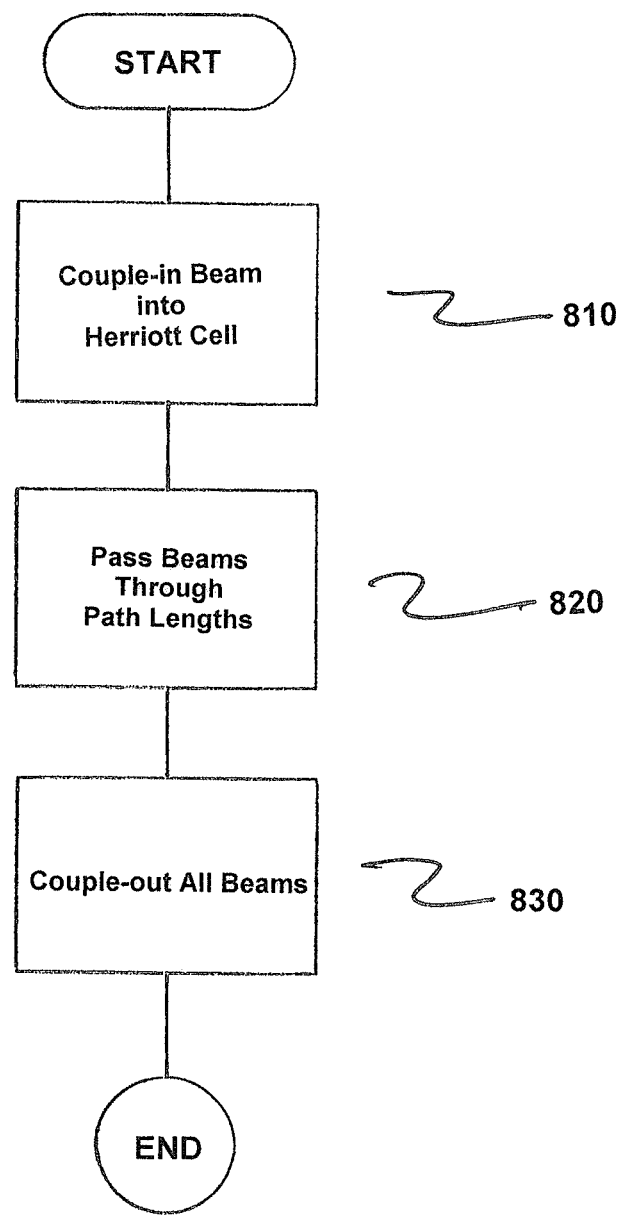
FIG. 8 shows a flowchart of the method in accordance with the invention.

FIG. 8 is a flowchart of the gas analysis method, in which beams 7, 8, 9 of at least two different radiation sources 10, 11, 12 are coupled into a Herriott cell 1 containing a measurement gas 2 and, after being reflected multiple times, are coupled out therefrom and detected, where the beams 7, 8, 9 are aligned such that the beams strike mirrors 5, 6 in point patterns 20, 21, 22; 20', 21', 22' that extend along ellipses 17, 18, 19; 17', 18', 19', the different ellipses 17, 18, 19; 17', 18', 19' lie inside one another and have two shared vertices (co-vertices) 24, 25 on a shared axis of symmetry 23, whereas other co-vertices (or vertices) do not coincide. The method comprises coupling at least one of the beams 7, 8, 9 of at least two of the different radiation sources 10, 11, 12 at least one of (i) into the Herriott cell 1 at differing points 29, 30, 31 of the associated point pattern 20, 21, 22; 20', 21', 22' and (ii) into the Herriott cell 1 such that the beams 7, 8, 9 of at least two of the different radiation sources 10, 11, 12 pass through the associated point patterns 20, 21, 22; 20', 21', 22' along the ellipses 17, 18, 19; 17', 18', 19' in opposite directions, as indicated in step 810.

Next, the beams 7, 8, 9 of the at least two of the different radiation sources 10, 11, 12 are now passed through differing path lengths in the Herriott cell 1, as indicated in step 820.

Next, all beams 7, 8, 9 are coupled out at a point of one of the shared vertices (or co-vertices) 24, 25; 24', as indicated in step 830.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gas analyzer comprising:
   a detector;
   a Herriott cell containing a measurement gas with two mirrors; and
   at least two different radiation sources arranged and aligned in relation to the Herriott cell such that beams which are coupled by said at least two different radiation sources into the Herriott cell and reflected between the two mirrors strike the two mirrors in point patterns which extend along ellipses;
   wherein the ellipses lie inside one another and have two shared vertices or co-vertices on a shared axis of symmetry and other co-vertices or vertices which do not coincide;
   wherein the beams of at least two of the least two different radiation sources at least one of (i) enter the Herriott cell at differing points of the associated point pattern and (ii) enter the Herriott cell such that said beams of at least two of the at least two different radiation sources pass through the associated point patterns along the ellipses in opposite directions;
   wherein all beams exit the Herriott cell at a point of one of the shared vertices and strike the detector; and
   wherein said beams of the at least two of the different radiation sources pass through differing path lengths in the Herriott cell.

2. The gas analyzer as claimed in claim 1, wherein the shared vertices of the ellipses form main vertices of the ellipses.

3. The gas analyzer as claimed in claim 2, wherein the outer ellipse forms a circle.

4. The gas analyzer as claimed in claim 1, wherein by at least one further radiation source, the beam thereof entering the Herriott cell together with a beam of one of the at least two different radiation sources at the same point, such that beam thereof entering the Herriott cell together with the beam of one of the at least two different radiation sources at the same point passes through the point pattern along the same ellipse in an opposite direction to that of the beam.

5. A gas analysis method, in which beams of at least two different radiation sources are coupled into a Herriott cell containing a measurement gas and, after being reflected multiple times, are coupled out therefrom and detected, the beams being aligned such that said beams strike mirrors in point patterns which extend along ellipses, the ellipses lying inside one another and having two shared vertices or co-vertices on a shared axis of symmetry and other co-vertices or vertices which do not coincide, the method comprising:

coupling at least one of the beams of at least two of the different radiation sources at least one of (i) into the Herriott cell at differing points of the associated point pattern and (ii) into the Herriott cell such that the beams of at least two of the different radiation sources pass through the associated point patterns along the ellipses in opposite directions;

passing the beams of the at least two of the different radiation sources through differing path lengths in the Herriott cell; and coupling out all beams at a point of one of the shared vertices or co-vertices.

6. The gas analysis method as claimed in claim 5, wherein the beams are coupled out at a point of a shared primary vertex of the ellipses.

7. The gas analysis method as claimed in claim 6, wherein an outer ellipse forms a circle.

8. The gas analysis method as claimed in claim 5, wherein a further beam of a further radiation source is coupled into the Herriott cell, together with the beam of at least one of the two different radiation sources at the same point, such that said further beam of the further radiation source coupled into the Herriott cell, together with the beam of at least one of the two different radiation sources at the same point passes through the point pattern along the same ellipse in an opposite direction to that of the beam.

9. The gas analysis method as claimed in claim 6, wherein a further beam of a further radiation source is coupled into the Herriott cell, together with the beam of at least one of the two different radiation sources at the same point, such that said further beam of the further radiation source coupled into the Herriott cell, together with the beam of at least one of the two different radiation sources at the same point passes through the point pattern along the same ellipse in an opposite direction to that of the beam.

10. The gas analysis method as claimed in claim 7, wherein a further beam of a further radiation source is coupled into the Herriott cell, together with the beam of at least one of the two different radiation sources at the same point, such that said further beam of the further radiation source coupled into the Herriott cell, together with the beam of at least one of the two different radiation sources at the same point passes through the point pattern along the same ellipse in an opposite direction to that of the beam.

\* \* \* \* \*